(12) United States Patent
Wenzel et al.

(10) Patent No.: US 9,340,912 B2
(45) Date of Patent: May 17, 2016

(54) METHOD FOR STITCHING VEHICLE INTERIOR COMPONENTS AND COMPONENTS FORMED FROM THE METHOD

(71) Applicants: Edward J. Wenzel, Troy, MI (US); Ramez Habhab, Rochester Hills, MI (US); Patrick Eckhout, Rochester, MI (US)

(72) Inventors: Edward J. Wenzel, Troy, MI (US); Ramez Habhab, Rochester Hills, MI (US); Patrick Eckhout, Rochester, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 14/521,390

(22) Filed: Oct. 22, 2014

(65) Prior Publication Data
US 2015/0042117 A1    Feb. 12, 2015

Related U.S. Application Data

(63) Continuation-in-part of application No. 14/450,609, filed on Aug. 4, 2014, which is a continuation-in-part of application No. 13/543,484, filed on Jul. 6, 2012, now Pat. No. 8,833,829, application No. 14/521,390, (Continued)

(51) Int. Cl.
*B60J 9/00* (2006.01)
*D05C 7/04* (2006.01)
(Continued)

(52) U.S. Cl.
CPC . *D05C 7/04* (2013.01); *B60R 13/02* (2013.01); *D05B 1/06* (2013.01); *D05B 15/00* (2013.01); *B60R 2013/0293* (2013.01); *D10B 2403/011* (2013.01); *D10B 2505/12* (2013.01)

(58) Field of Classification Search
CPC .. D05C 7/04; B60R 13/02; B60R 2013/0293; D05B 1/06; D05B 15/00; D10B 2403/011; D10B 2505/12
See application file for complete search history.

(56) References Cited

U.S. PATENT DOCUMENTS

| 1,731,221 A | 10/1929 | Becker |
| 1,820,935 A | 9/1931 | Buhler |

(Continued)

FOREIGN PATENT DOCUMENTS

| CN | 1298974 A | 6/2001 |
| CN | 1325466 A | 12/2001 |

(Continued)

OTHER PUBLICATIONS

English Translation of the first office action for patent application No. 201280033806.X; Date of Issue: Feb. 3, 2015.

(Continued)

*Primary Examiner* — Lori L Lyjak
(74) *Attorney, Agent, or Firm* — Cantor Colburn LLP

(57) ABSTRACT

A method of applying stitching to an interior component is provided herein. The interior component having only a single layer of a substrate layer. The method including the steps of: a) penetrating substrate layer with an awl to form a piercing therethrough; b) retracting the awl from the substrate layer; c) inserting a needle of a robotic sewing head through the piercing through the substrate layer to grasp a thread positioned on a show surface of the outer skin layer; d) pulling the thread through the substrate layer; e) looping the thread with a previous stitch passed through the substrate layer; f) advancing the robotic sewing head to another position with respect to the interior component, wherein a backside of the substrate layer is free of obstructions; and g) repeating steps a-f until a predetermined amount of stitches are applied to the interior component.

18 Claims, 10 Drawing Sheets

Related U.S. Application Data which is a continuation-in-part of application No. 13/543,489, filed on Jul. 6, 2012, now Pat. No. 8,919,270.

(60) Provisional application No. 61/505,833, filed on Jul. 8, 2011, provisional application No. 61/505,836, filed on Jul. 8, 2011.

(51) Int. Cl.
*D05B 1/06* (2006.01)
*D05B 15/00* (2006.01)
*B60R 13/02* (2006.01)

(56) References Cited

U.S. PATENT DOCUMENTS

| | | | |
|---|---|---|---|
| 2,147,006 A | 2/1939 | Zablocki |
| 2,328,705 A | 9/1943 | Becker |
| 2,332,125 A | 10/1943 | Zonis et al. |
| 2,386,660 A | 10/1945 | Clayton |
| 2,430,087 A | 11/1947 | Stritter |
| 2,529,575 A | 11/1950 | Sailer |
| 2,860,591 A | 11/1958 | Ness |
| 3,602,168 A | 8/1971 | Yamashita |
| 3,866,554 A | 2/1975 | Holtzman |
| 3,875,877 A | 4/1975 | Fox |
| 4,169,422 A | 10/1979 | Hayes et al. |
| 4,561,367 A | 12/1985 | Corbett et al. |
| 4,711,190 A | 12/1987 | Smith |
| 5,094,180 A | 3/1992 | Salganik |
| 5,313,897 A | 5/1994 | Katamine et al. |
| 5,390,950 A | 2/1995 | Barnes et al. |
| 5,679,296 A | 10/1997 | Kelman et al. |
| 5,873,318 A | 2/1999 | Bohlinger et al. |
| 5,988,085 A | 11/1999 | Martz |
| 6,045,732 A | 4/2000 | Nakatsuji et al. |
| 6,095,069 A | 8/2000 | Tadzhibaev |
| 6,129,031 A | 10/2000 | Sarh et al. |
| 6,178,903 B1 | 1/2001 | Bondanza et al. |
| 6,401,643 B2 | 6/2002 | Iida |
| 6,450,678 B1 | 9/2002 | Bayersdorfer |
| 6,997,126 B2 | 2/2006 | Murley |
| 7,278,363 B2 | 10/2007 | Wieczorek et al. |
| 7,401,829 B2 | 7/2008 | Michalski et al. |
| 7,431,484 B2 | 10/2008 | Fong |
| 7,661,740 B2 | 2/2010 | Saito |
| 8,215,810 B2 | 7/2012 | Welch, Sr. et al. |
| 8,316,785 B2 | 11/2012 | Boinais et al. |
| 8,833,829 B2 | 9/2014 | Wenzel et al. |
| 8,919,270 B2 | 12/2014 | Wenzel et al. |
| 9,010,259 B2 | 4/2015 | Schwarzberger |
| 2003/0168151 A1 | 9/2003 | Wright et al. |
| 2006/0197321 A1 | 9/2006 | Saito et al. |
| 2009/0316401 A1 | 12/2009 | Choquet et al. |
| 2010/0296302 A1 | 11/2010 | Welch, Sr. et al. |
| 2011/0030596 A1 | 2/2011 | Boinais et al. |
| 2011/0063872 A1 | 3/2011 | Irie et al. |
| 2011/0084852 A1 | 4/2011 | Szczerba et al. |
| 2012/0297643 A1 | 11/2012 | Shaffer et al. |
| 2015/0033996 A1 | 2/2015 | Wenzel et al. |
| 2015/0040812 A1 | 2/2015 | Schwarzberger |

FOREIGN PATENT DOCUMENTS

| | | |
|---|---|---|
| CN | 1826443 A | 8/2006 |
| CN | 201176507 | 1/2009 |
| DE | 3703070 A1 | 9/1988 |
| JP | 03097491 A | 4/1991 |
| JP | 2001162068 A | 6/2001 |
| JP | 2006273312 A | 10/2006 |
| JP | 2013043571 A | 3/2013 |
| KR | 1020030024287 A | 3/2003 |
| KR | 1020060050815 A | 5/2006 |
| WO | 2004078518 | 9/2004 |
| WO | 2013090371 | 6/2013 |

OTHER PUBLICATIONS

First office action for patent application No. 201280033806.X; Date of Issue: Feb. 3, 2015.
English Translation of CN201176507 Abstract.
English Translation of DE10060771 Abstract which corresponds with CN1298974.
Written Opinion dated Jan. 25, 2013 for International application No. PCT/US2012/045798.
Englisth Abstract CN1746365, equivilent to KR102006000815.
Englisth Abstract JP03097491.
Englisth Abstract JP2001162068.
International Search Report dated Jan. 25, 2013 for International application No. PCT/US2012/045798.
English Abstract KR1020030024287.
English Translation of DE3703070 Abstract.
English Translation of JP2013043571 Abstract.

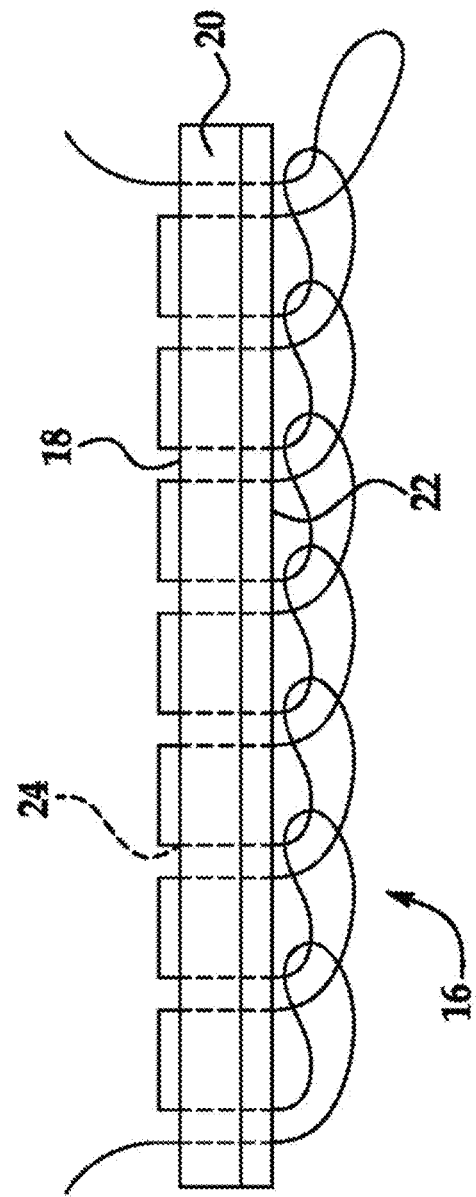

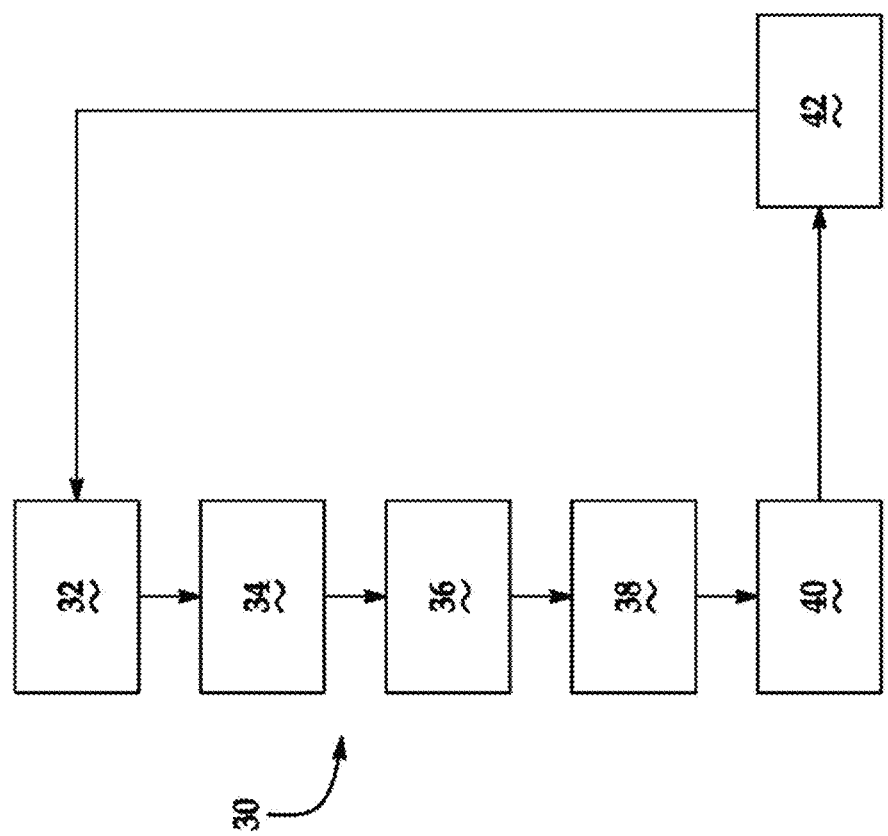

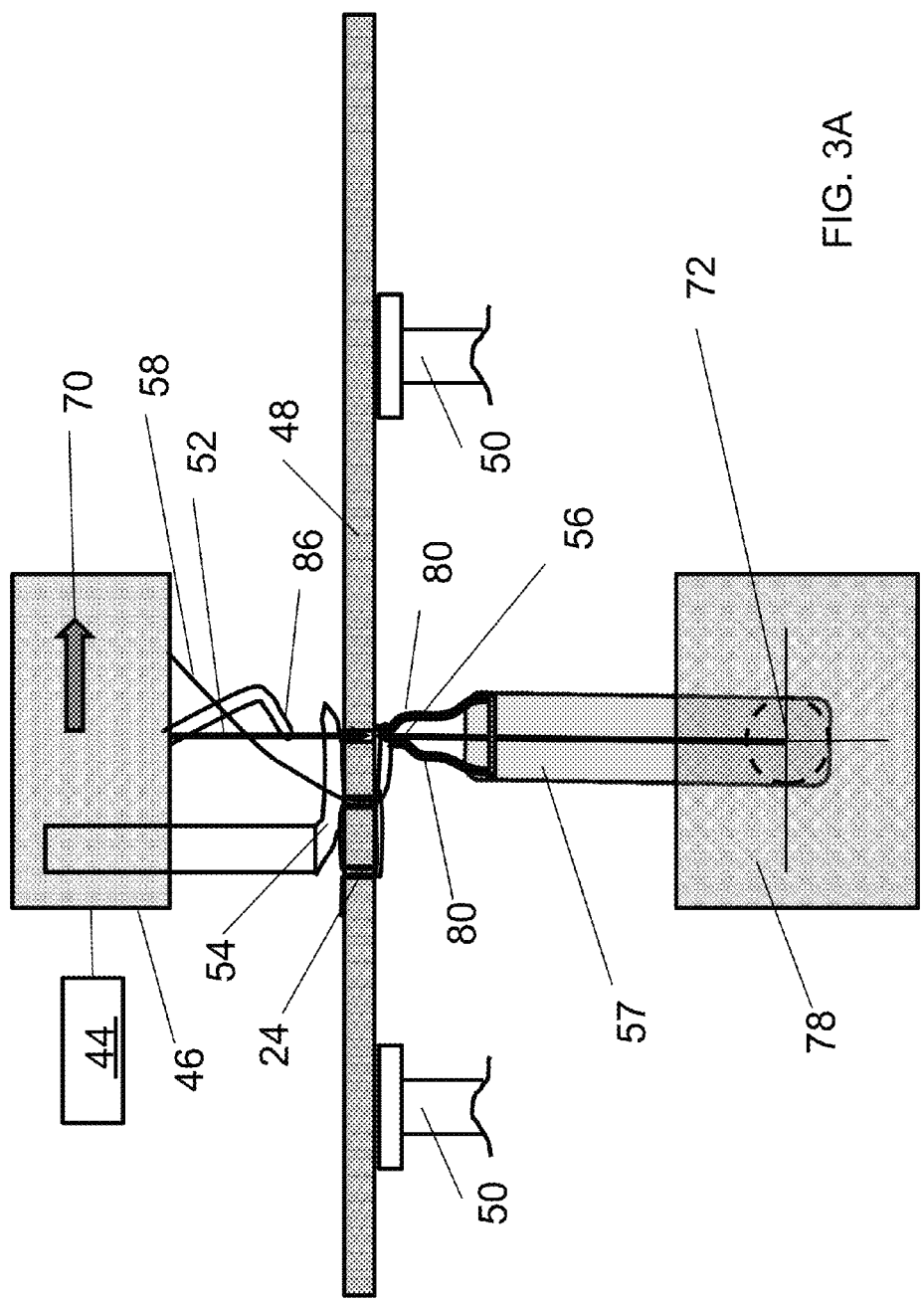

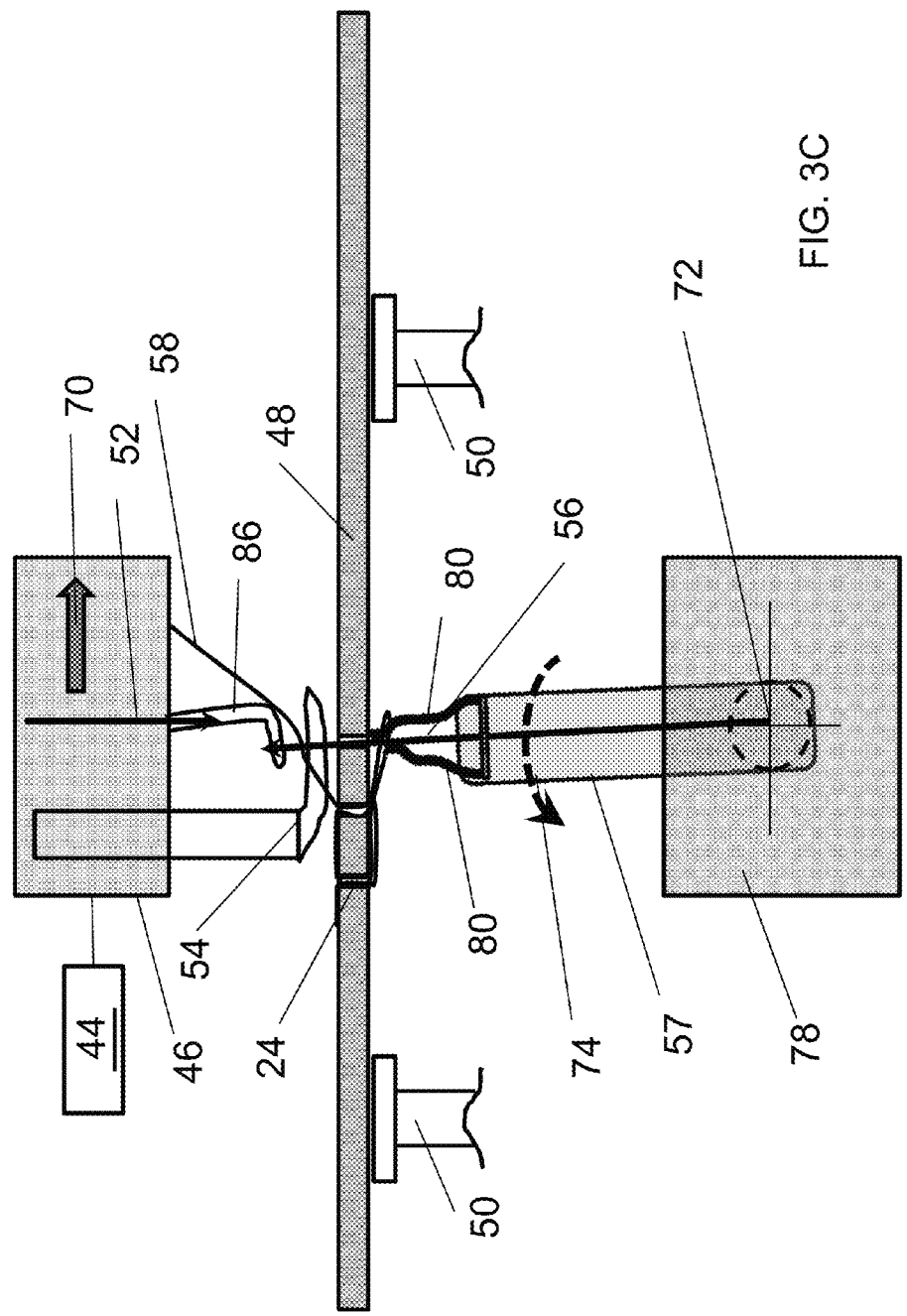

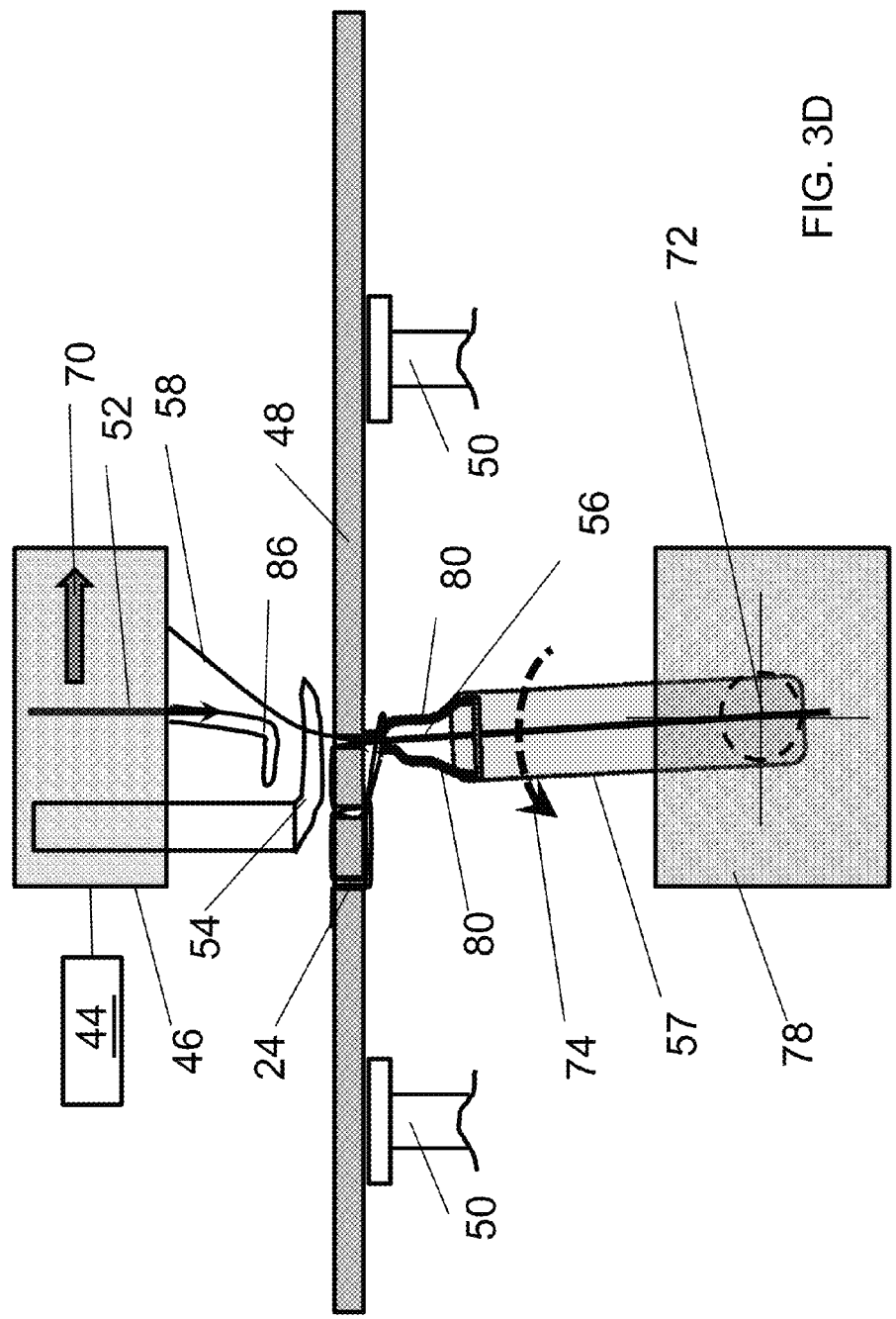

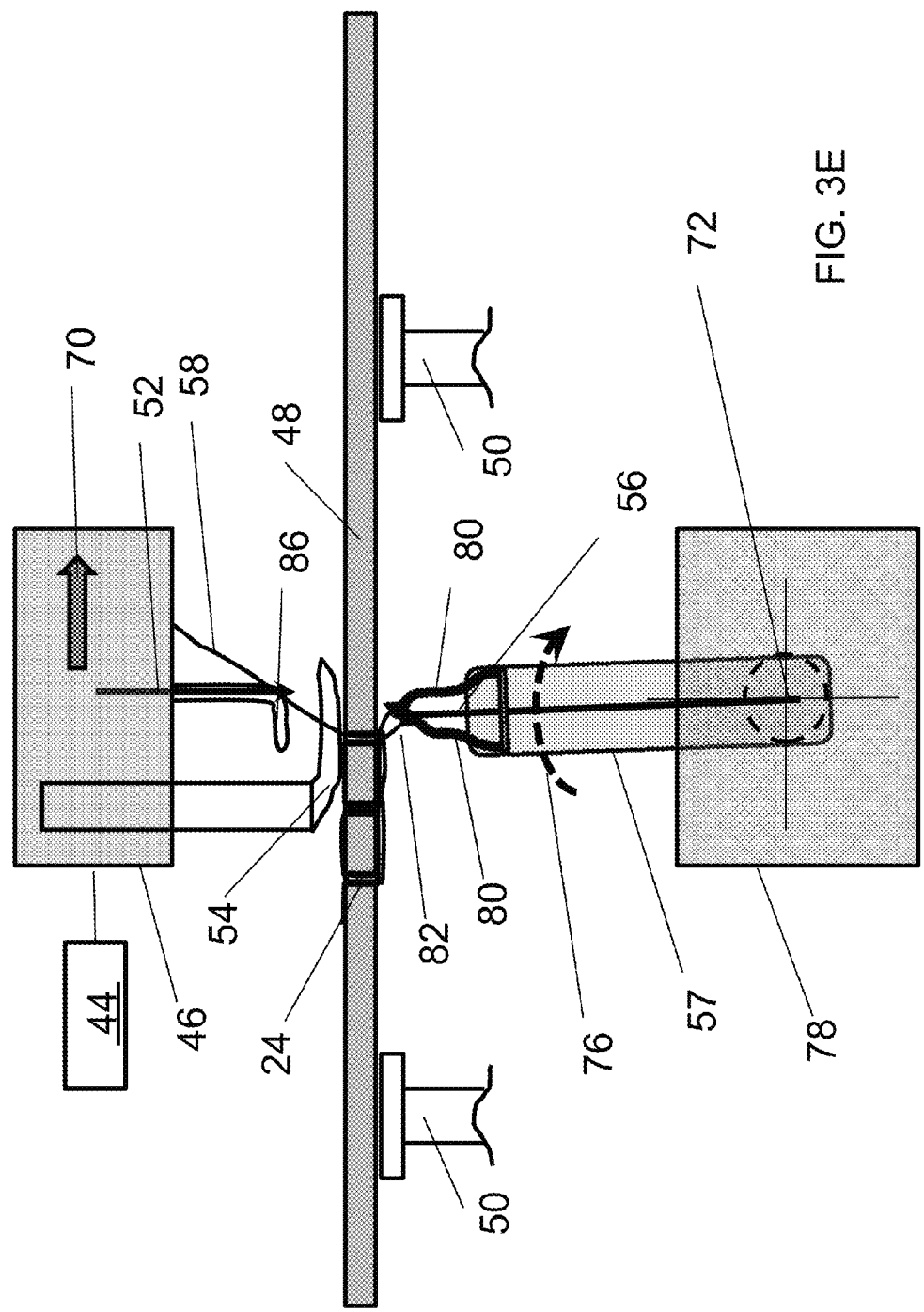

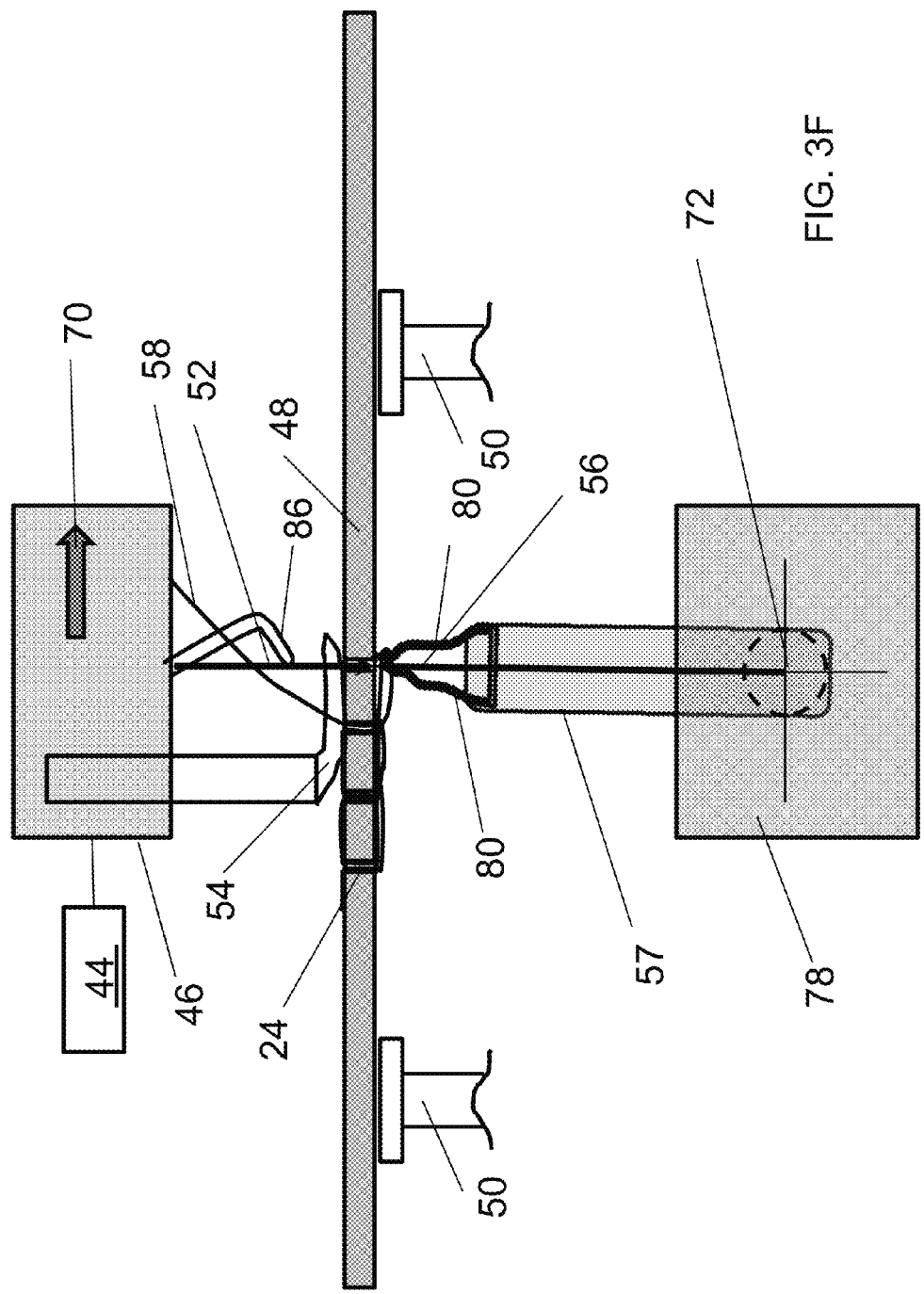

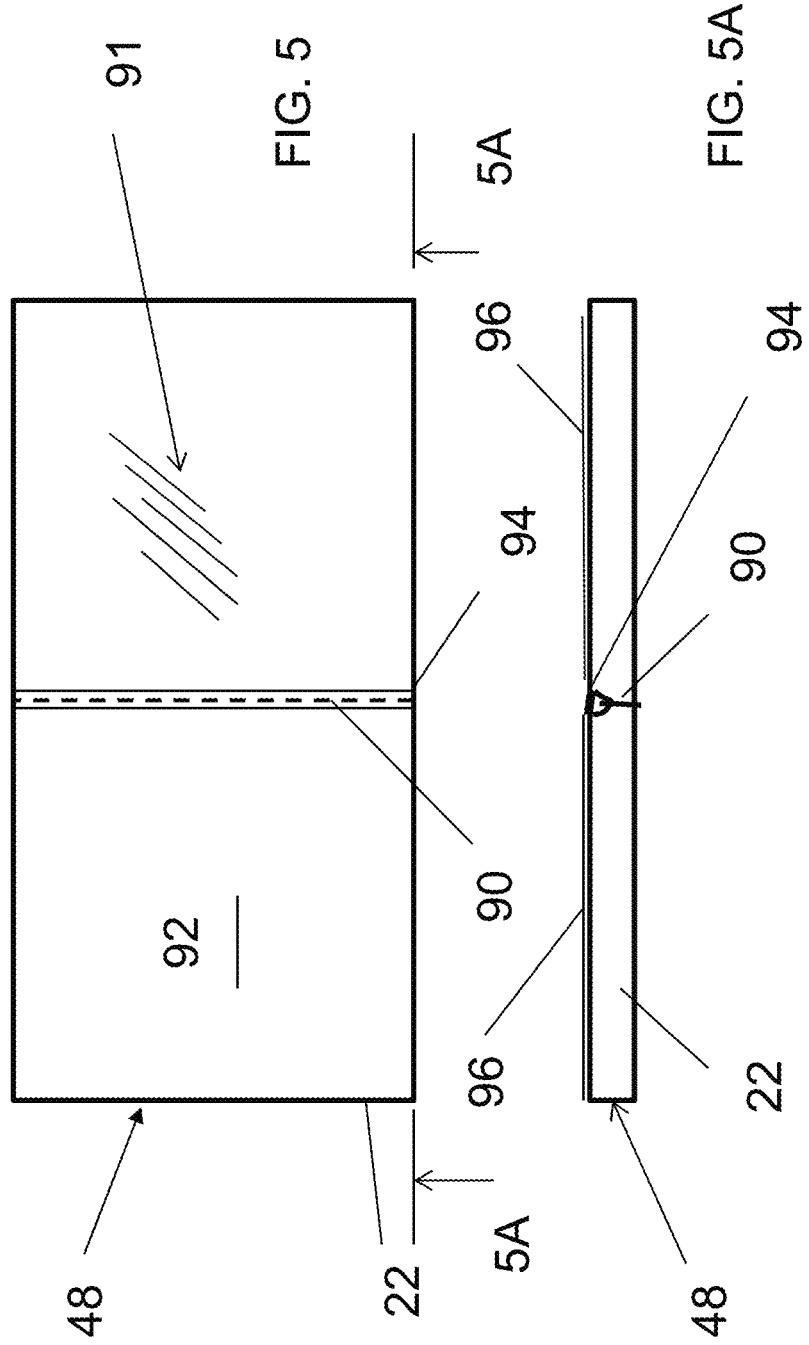

METHOD FOR STITCHING VEHICLE INTERIOR COMPONENTS AND COMPONENTS FORMED FROM THE METHOD

CROSS REFERENCE TO RELATED APPLICATIONS

This application is a continuation-in-part of U.S. patent application Ser. No. 14/450,609 filed Aug. 4, 2014, which is a continuation-in-part of U.S. patent application Ser. No. 13/543,484 filed Jul. 6, 2012, now U.S. Pat. No. 8,833,829, which claims the benefit of U.S. Provisional Application Ser. No. 61/505,833, filed Jul. 8, 2011, the contents each of which are incorporated herein by reference thereto.

This application is also a continuation-in-part of U.S. patent application Ser. No. 13/543,489 filed Jul. 6, 2012, which claims the benefit of U.S. Provisional Application Ser. No. 61/505,836, filed Jul. 8, 2011, the contents of each of which are incorporated herein by reference thereto.

BACKGROUND

This invention relates to an interior structure for a vehicle interior. More particularly, the invention relates to an apparatus for stitching vehicle interior components.

Currently, most stitching found in an automotive interior is of the functional variety, wherein two or more pieces of material (leather, vinyl, TPO, cloth, etc.) are cut from a pattern and sewn together (cut-n-sew) prior to being wrapped around a component such as a seat cushion, head rest, arm rest, console lid, instrument panel substrate, etc. Such functional stitching is very labor intensive and is normally used only where required on low and mid-class vehicles. Functional stitching on decorate components such as instrument panel retainers and door panels has typically been restricted to higher class vehicles due to cost.

In recent years, automotive original equipment manufacturers (OEMs) have shown an interest in applying the "stitched" look to more vehicles over a wider range of price classes. A simulated non-functional stitch has been used in some applications; however, the ability to offer a simulated stitch in a contrasting color is not production feasible at this time. Additionally, more OEMs are requested that a real or "live" stitch be used on decorate components to provide the look and feel of a true cut-n-sew component.

Accordingly, it is desirable to provide a live, non-functional stitch on decorative automotive trim components.

SUMMARY OF THE INVENTION

A method of applying stitching to an interior component, comprising an outer skin layer, a substrate layer and an intermediary layer located between the outer skin layer and the substrate layer is provided. The method including the steps of: a) penetrating the outer skin layer, the substrate layer and the intermediary layer with an awl to form a piercing therethrough; b) retracting the awl from the outer skin layer, the substrate layer and the intermediary layer; c) inserting a needle of a robotic sewing head through the piercing through the substrate layer, the intermediary layer and the outer skin layer to grasp a thread positioned on the outer skin layer; d) pulling the thread through the outer skin layer, the intermediary layer and the substrate layer; e) looping the thread with a previous stitch passed through the outer skin layer, the intermediary layer and the substrate layer; f) advancing the robotic sewing head to another position with respect to the interior component to another position; and g) repeating steps a-f until a predetermined amount of stitches are applied to the interior component.

Also provided herein is an interior component of a vehicle formed by the above method.

In another embodiment, a method of applying stitching to an interior component is provided. The method including the steps of: a) penetrating the outer skin layer, the substrate layer and the intermediary layer with an awl to form a piercing therethrough; b) retracting the awl from the outer skin layer, the substrate layer and the intermediary layer; c) inserting a needle of a robotic sewing head through the piercing through the substrate layer, the intermediary layer and the outer skin layer to grasp a thread positioned on the outer skin layer; d) pulling the thread through the outer skin layer, the intermediary layer and the substrate layer; e) looping the thread with a previous stitch passed through the outer skin layer, the intermediary layer and the substrate layer; f) advancing the robotic sewing head to another position with respect to the interior component, wherein a backside of the substrate layer is free of obstructions; and g) repeating steps a-f until a predetermined amount of stitches are applied to the interior component.

In yet another embodiment, a method of applying stitching to an interior component, comprising only a substrate layer is provided. The method including the steps of: a) penetrating the substrate layer with an awl to form a piercing therethrough; b) retracting the awl from the substrate layer; c) inserting a needle of a robotic sewing head through the piercing through the substrate layer layer to grasp a thread positioned on a show surface of the substrate layer; d) pulling the thread through the substrate layer; e) looping the thread with a previous stitch passed through the substrate layer; f) advancing the robotic sewing head to another position with respect to the interior component to another position; and g) repeating steps a-f until a predetermined amount of stitches are applied to the interior component.

In another embodiment, a method of applying stitching to an interior component is provided. The method including the steps of: a) penetrating the substrate layer with an awl to form a piercing therethrough; b) retracting the substrate layer; c) inserting a needle of a robotic sewing head through the piercing through the substrate layer to grasp a thread positioned on a show surface of the substrate layer; d) pulling the thread through the substrate layer; e) looping the thread with a previous stitch passed through the substrate layer; f) advancing the robotic sewing head to another position with respect to the interior component, wherein a backside of the substrate layer is free of obstructions; and g) repeating steps a-f until a predetermined amount of stitches are applied to the interior component.

Also provided herein is an interior component of a vehicle formed by the above methods.

BRIEF DESCRIPTION OF THE DRAWINGS

Other features, advantages and details appear, by way of example only, in the following description of embodiments, the description referring to the drawings in which:

FIG. 1 is a cross-sectional view of an interior portion of a component stitched in accordance with an exemplary embodiment of the present invention; and FIG. 2 is a flow chart illustrating a method according to one exemplary embodiment of the present invention;

FIGS. 3A-3F illustrate one non-limiting use of a robot to drive a sewing head over a stationary part on a fixture;

FIG. 5 is a view of a single layer part 48 according to one non-limiting embodiment of the present invention; and FIG. 5A is a view along lines 5A-5A of FIG. 5.

DETAILED DESCRIPTION

Figure 3B:
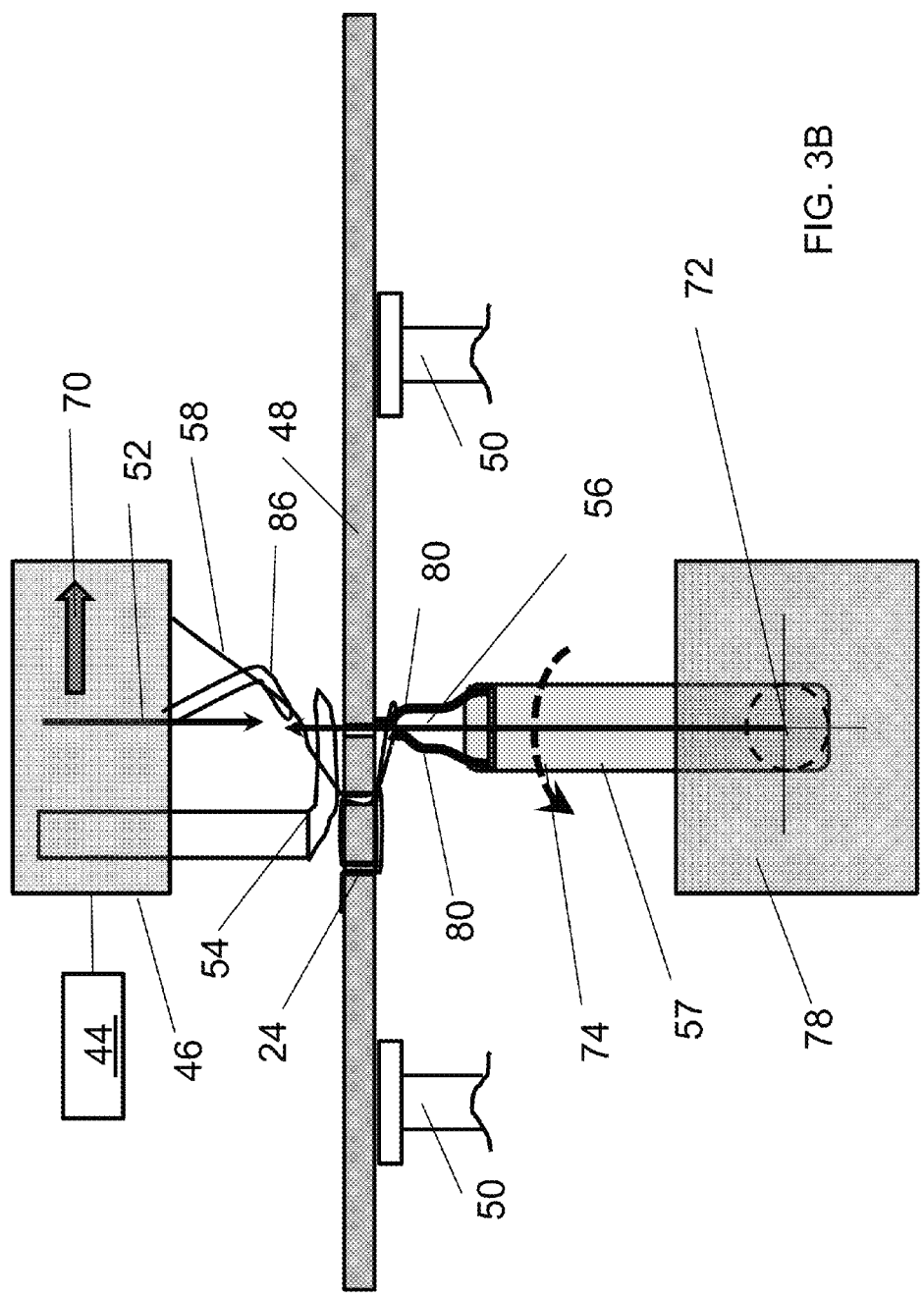

Turning now to the drawings, wherein to the extent possible like reference numerals are utilized to designate like components throughout the various views, in FIG. 1 it is seen that an interior portion 16 of a vehicle is illustrated. In one implementation interior portion 16 is a portion of an instrument panel of a vehicle.

As best illustrated in FIG. 1, the interior portion 16 is preferably of a multi-layered construction. This multi-layered construction preferably includes an outer skin layer 18 having a substantially smooth outer surface and an underside facing away from the outer surface. The outer skin layer 18 is preferably formed of a plastic material of substantial flexibility and aesthetically pleasing character.

In order to enhance the softness of portion 16, a layer of cushioning support material 20 is provided in the region below the outer skin layer 18. It is contemplated that the cushioning support material 20 may be of any number of different constructions although a foamed material such as cross linked polypropylene (XLPP) foam may be potentially preferred. A substrate panel or layer 22 of dimensionally stable plastic or other suitable material is preferably disposed below the cushioning support material.

According to the potentially preferred embodiment, the cushioning support material 20 and the substrate panel 22 thus serve cooperatively to provide a support structure for the outer skin layer 18.

It is contemplated that XLPP foam forming the cushioning support material 20 may be blown between the outer skin layer 18 and the substrate panel 22 so as to form a multi-layered composite structure of a form substantially as illustrated in FIG. 1. It is also contemplated that the cushioning material 20 may be attached to the outer skin layer 18 in a preliminary cladding operation so as to form a preliminary layered composite which may thereafter be applied across any substrate panel 22 as may be utilized. It is also contemplated that the cushioning material 20 may be attached to the substrate panel 22 in a preliminary cladding operation so as to form a preliminary layered composite which may thereafter be covered by the outer skin layer 18.

In accordance with an exemplary embodiment of the present invention live non-functional stitching can be applied interior portion in one of the following ways:

1) Stitch a pattern on an unformed single or multilayer construction of trim material and wrap the sewn trim sheet around a preformed/precut substrate;

2) Stitch a pattern on a preformed single or multilayer construction of trim material and bond the sewn trim preform to a preformed molded substrate; and 3) Stitch a pattern on a flat or relatively flat single or multilayer trim & substrate component construction.

As the part complexity and size increase, option 1 becomes impractical as unformed trim material can only be applied to relatively flat surfaces.

Option 2 requires that the size and shape of the preformed & stitched skin match that of the molded substrate nearly perfect. Also, option 2 requires that all surfaces in die draw have adequate draft in order to accommodate nesting without damage to the preform. All undercuts with Option 2 require automated or manual edge wrapping to finish.

Option 3 eliminates the fit and finish issues associated with option 2 but is limited by the ability of the sewing machine to reach confined areas of the part while possessing the capability to drive a needle through trim and substrate material of the component. Likewise, any backside features (ribbing, bosses, etc.) required for component structure or attachment cannot be located in the area directly behind/beneath the stitch path.

This application proposes a means to stitch through trim and substrate of a large, contoured soft trim clad automotive interior trim panel to eliminate the manufacturing cost and complexity associated with Option 2 above and be designed and manufactured in such a way that the stitching can be located directly above backside features if required.

Various exemplary embodiments of the invention described herein consists of the use of a chain stitch pattern machine that uses an awl on the upper portion of the head to penetrate the trim and substrate of the interior component. After the awl exits a hole 24 it produced in the component, a needle with a hook protrudes into and through the hole 24 from the lower arm of the machine to grasp the thread held in position by a thread tensioner arm. Once hooked, the thread is pulled through the hole and through the loop from the previous stitch. The needle also advances the part to the next point of awl penetration as it pulls the thread down through the hole 24. The needle then advances to the hook position once again while the awl is engaged with the part so the part does not move and needle can move through the newly formed hole without hesitation once the awl exits the part. By utilizing an awl to produce the stitch hole, much more robust material constructions can be stitched (composites, metals, etc.) with minimal damage to the top surface of the part or the awl. Damage to the thread is minimized by the fact that the thread is not pulled back and forth through the hole multiple times as is the case with the lockstitch pattern. Very large tex threads can be used without concern for needle breakage.

The post bed stitch plate for such a chain stitch machine as described above can be a small as 10 mm×10 mm, a significant reduction from previous robotic chain stitch plate dimension of 16 mm×44 mm (of course, dimensions greater or less than these are considered to be within the scope of exemplary embodiments of the present invention). Access to very tight confines of parts is now possible, particularly through-plane radii wherein minimizing stitch plate length is critical.

The optimal machine configuration for sewing trim/substrate constructions in a manual fashion would be a high post, long arm machine. Manual or fixture guided part feed would be required.

The optimal machine configuration for robotic sewing would be dependent on the part design. The key factor again is the compact size of the stitch plate. Cylinder arm length and post bed height would depend on the application.

To facilitate the stitch location on the part, it is proposed that the backside or ISM side of the retainer be free and clear of any multiplane style line, ribs, bosses or any other obstruction that would prevent passage/contact of the stitch plate along the backside of the part for the entire stitch length. In the event that a backside feature cannot be moved from the stitch path, it is proposed that a separate component be molded which contains said feature and be subsequently attached the substrate after stitching. This secondary attachment could be performed via heat staking, IR welding, adhesives, or any other suitable method.

It is also proposed that the substrate material be locally reduced to a thickness more suitable for stitching should the need arise. For instance, a part with a nominal wall thickness of 2.5 mm could locally be reduced to 1.5 or 2.0 mm at a width of 15 to 20 mm along the stitch path. This depression in the backside of the part would also serve to locate a separate piece containing ribs or bosses as needed prior to attachment. Compression molding of the substrate panel could accommodate a reduction in nominal wall thickness from 2.0 mm to 1-1.5 mm in the stitching area. Of course, dimensions greater or less than the aforementioned values are considered to be within the scope of exemplary embodiments of the present invention.

Referring now to FIG. 2 a flow chart 30 illustrating a method of applying stitching to an interior component according to one exemplary embodiment of the present invention is provided. Here the interior component has an outer skin layer, a substrate layer and an intermediary layer located between the outer skin layer and the substrate layer.

At box 32, the outer skin layer, the substrate layer and the intermediary layer are penetrated with an awl to form a piercing therethrough. At box 34, the awl is retracted after the piercing is formed.

Thereafter and at box 36, a needle is inserted through the piercing (e.g., through the substrate layer, the intermediary layer and the outer skin layer) to grasp a thread positioned on the outer skin layer. Once the step of box 36 is completed, the thread is pulled through the outer skin layer, the intermediary layer and the substrate layer at box 38.

Afterwards and at box 40, the thread is looped with a previous stitch passed through the outer skin layer, the intermediary layer and the substrate layer, unless of course this is the first stitch. Once the step of box 40 is completed, the interior component is advanced or moved to another position relative to the awl and needle at box 42 and then the processes or steps of boxes 32-42 are repeated until a predetermined amount of stitches are applied to the interior component.

As mentioned above and in applications wherein robotic sewing is employed. A robot is used to drive or relocate a sewing head over a stationary part on a fixture.

See for example, FIGS. 3A-3F and 4, wherein one non-limiting use of a robot 44 is employed to drive a sewing head 46 over a stationary part 48 on a fixture. Although robot 44 is shown schematically it is understood that robot 44 may comprise a portion of head 46 or head 46 may be located on an end of a robotic arm.

In FIG. 3A an awl 52 of the sewing head 46 begins upward motion towards top dead center (TDC) of its movement via a reciprocating mechanism or eccentric 53 that drives the awl 52 up and down as is known in the related arts. In other words and as used herein top dead center (TDC) of the awl 52 refers to the top most position of the awl 52 with respect to the part 48. The eccentric 53 is operably coupled to an upper drive shaft 81 as well as awl 52. Also shown is that a presser foot 54 begins to lift off of the surface of the part 48. The presser foot 54 is driven by or operably coupled to a separate eccentric 55 that is also tied or operable coupled to the upper drive shaft 81 of the sewing head 46. In one non-limiting configuration, the upper drive shaft 81 is driven by a motor 85. The movement of the presser foot 54 is coordinated with the movement of the awl 52, but driven by a separate eccentric 55 also operatively coupled to upper drive shaft 81. Accordingly and as the upper drive shaft 81 is rotated, eccentrics 53 and 55 operably coupled to the upper drive shaft 81 are rotated and the desired movement of awl 52 and presser foot 54 is achieved.

At the same time a needle 56 of a lower needle bar assembly 57 begins its upward motion to receive a new thread 58.

In FIG. 3A, the sewing head 46 is being driven forward in the direction of arrow 70 by robot 44 and the lower needle bar assembly 57 is in a full forward position. It being understood that the needle bar assembly 57 and needle 56 can pivot or rotate about axis 72 such that movement in the direction of arrows 74 (FIG. 3B) and 76 (FIG. 3E) is possible.

In FIG. 3B, the awl 52 is shown near its top dead center (TDC) or its highest range of movement with respect to an eccentric 77 and the foot 54 lifts off the part 48 and the needle 56 continues upward motion to receive a new thread 58. The robot 44 continually drives the head 46 forward in the direction of arrow 70 and the lower needle bar assembly 57 begins rearward motion in the direction of arrow 74 via an eccentric 77 operably coupled to the needle bar assembly 57 and located in the lower drive mechanism 78.

Figure 4:
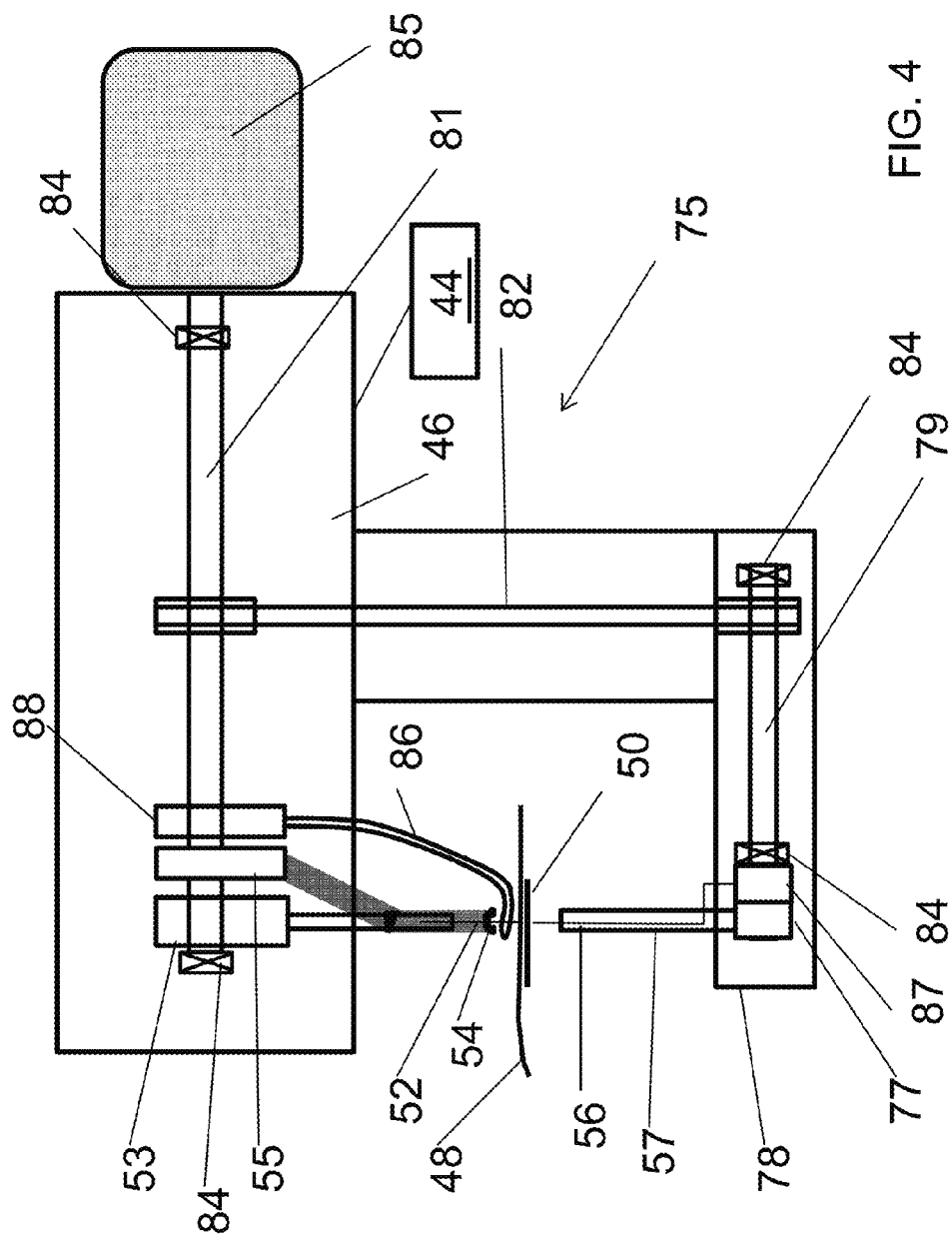
FIG. 4 is a schematic illustration of one non-limiting configuration of an apparatus operably coupled to the robot illustrated in FIGS. 3A-3F.

See FIG. 4 for example, which illustrates one non-limiting configuration of an apparatus 75 configured to drive or move the awl 52 and the needle 56 in the desired directions. The eccentric 77 is located in lower drive mechanism 78 and is driven by or operably coupled to a lower drive shaft 79. As the eccentric 77 is rotated by the lower drive shaft 79, the eccentric 77 moves the needle bar assembly 57 in the directions of arrows 74 and 76. An eccentric 87 is also operably coupled to the lower drive shaft 79 as well as the needle 56 and eccentric 87 drives the upward and downward movement of the needle 56 as the lower drive shaft 79 is rotated thereby causing the desired movement of the needle 56 as the lower drive shaft 79 is rotated.

The lower drive shaft 79 is driven by the upper drive shaft 81 via a tensioned belt 82 or other means of direct coupling such that shafts 79 and 81 are operable coupled together and driven by a single motor 85. Both drive shafts 79 and 81 are rotatably received in bearings 84 located about apparatus 75.

In FIG. 3C, the awl 52 is at top dead center of its range of movement with respect to the part 48 and thus is at its furthest distance from the part 48 and the foot 54 is also spaced from or off of the part 48 while the needle 56 is also near top dead center with respect to the driving mechanism that moves the needle 56 up and down as is known in the related arts. The robot 44 continually drives the head 46 forward in the direction of arrow 70 while the lower needle bar assembly 57 continues rearward motion as shown in FIG. 3C.

Referring now to FIG. 3D, the awl 52 begins its descent downward towards the part and the foot 54 is spaced or off from the part 48 while the needle 56 is upward through the part 48 and hooks and pulls the thread 58 through hole 24. The robot 44 continually drives the head 46 forward in the direction of arrow 70 and the lower needle bar 57 assembly continues its rearward motion in the direction of arrow 74.

In FIG. 3E, the awl 52 is shown descending while the foot 54 is now nearly down on the part 48. Here the needle 56 is shown pulling the hooked thread 58 through castoff brackets 80 and a prior loop 82 of thread is released from the castoff brackets 80. As illustrated, the robot 44 continually drives the head 46 forward in the direction of arrow 70 and the lower needle bar assembly 57 begins its forward motion in the direction of arrow 76 via drive mechanism 78.

Referring now to FIG. 3F, the awl 52 is shown piercing the part 48 so that an opening 24 for needle 56 to pass through is made. Also shown is that the foot 54 is now down on the part 48. As the needle 56 begins its upward motion, it releases the thread 58 as it passes through the tip of the castoff brackets 80. Once again, the robot 44 continually drives the head 46 forward in the direction of arrow 70 while the lower needle bar assembly 57 is in a full forward position.

Accordingly and as illustrated in the above FIGS. and after the awl 52 exits a hole 24 it produced in the component 48, the needle 56 with a hook protrudes into and through the hole 24 from the lower arm of the machine to grasp the thread 58 held in position by a thread tensioner arm 86, whose movement is controlled by an eccentric 88 operably coupled to the upper drive shaft 81 as well as the thread tensioner arm 86 so that rotational movement of the upper drive shaft 81 causes the desired movement of the thread tensioner arm 86. Once hooked, the thread 58 is pulled through the hole 24 and through a loop from a previous stitch. As the robot 44 advances the sewing head 46 over the part 48, the needle 56 moves rearward relative to the forward movement of the sewing head 70, staying engaged with the part 48 until it exits the hole 24 with the thread 58. The needle 52 is then advanced by the lower bar assembly 57, which is in turn driven by the eccentric 77 operably coupled to the lower drive shaft 79.

Therefore and in an alternative embodiment and in at least step 40, the robot 44 is used to drive the sewing head over a stationary part 48 placed on a fixture 50. Robotic sewing is particularly advantageous as the size of the part being sewn increases. For example and as the size of the part being sewn increases, the weight and handle-ability of the part become difficult for an operator to manage. Since proper sewing head orientation relative to the part is required to achieve a good stitch, and the repeatability of a robot cannot be matched with a human operator it is desirable to use a robotically driven sewing head and in particular, for applications wherein the size of the part being sewn is large. In one non-limiting embodiment and in the aforementioned robotic application, a 6 axis robot may be employed to relocate the sewing head with respect to the part. It is, of course, understood that other types of robots may be employed for use with the relocation of the sewing head.

The use of a robotic head is provided as an alternative to a manual operation. In the manual operation, the needle is used to advance the part relative to a fixed sewing head.

In one non-limiting exemplary embodiment, the stationary part 48 comprises only a single layer for example, the substrate layer or substrate panel 22 (e.g., foam layer 20 and outer layer 18 are not used or employed and no other layers are applied). In one embodiment, the substrate panel 22 is formed from a dimensionally stable plastic or other suitable material such that a rigid panel or part is provided and for example no additional layers are required for decorative appearance or feel of the part's intended use. The substrate panel could also be formed from a material composite, which could but is not limited to, any number of different fiber laminates or concentrations of randomly oriented reinforcing fibers embedded within a matrix resin, provided that a top surface or show surface 92 of the composite substrate layer or panel 22 remains rigid. In this embodiment, the process cycle would be the same as sewing through the skin, foam and substrate but without the skin and foam since only a single substrate layer is used.

Referring to FIG. 5 and in one non-limiting embodiment, the single layer or stationary part 48 comprising only the substrate layer or panel 22 would have stitching 90 applied thereto. Here the stitching can be applied in any of the aforementioned steps and or processes. Also and referring now to FIG. 2 and for this embodiment, the flow chart 30 and boxes 32-42 may be referred to as stitching a single layer component, which in one embodiment may comprise only substrate layer or panel 22.

Still further and in one non-limiting embodiment, the part 48 comprising only substrate layer or panel 22 may be grained 91 on the show surface 92 of the part 48 comprising only substrate layer or panel 22. In yet another alternative embodiment or in combination with the graining of show surface 92, the part 48 may be molded with a faux seam 94 that is molded into the part 48 for aesthetic purposes and for a functional guide for sewing machine purposes. The faux seam 94 may be configured as a protrusion or a depression or groove in the show surface 92. In yet another alternative embodiment, the faux seam 94 may be configured as a French seam or a deck seam or any other real functional looking seam.

It being understood that the faux seam 94 is not required to produce a stitched single layer stationary part 48 comprising only substrate layer or panel 22 but simply may be one alternative embodiment.

In still yet another alternative embodiment, the molded part comprising only substrate layer or panel 22 may be covered on its show surface 92 with a soft touch paint 96 such as that commonly found on automotive instrument panels prior to sewing to provide a more realistic "soft" feel upon contact. In other words, the soft touch paint 96 now provides the show surface 92 or at least a portion thereof and is the surface of the part 48 that is viewed and/or touched when the part 48 is installed in its desired location and the soft touch paint 96 provides a softer show or exterior surface than that of the material of the substrate layer or panel 22. Alternatively, the soft touch paint 96 may be applied after the sewing step. Still further, a non-soft touch paint or "standard" paint 96 (for example a paint used on any automotive interior trim panel) may be applied to the show surface 92 to cover any blemishes on the part surface 92 and provide an aesthetically pleasing surface (e.g., show surface 92). In other words, the paint 96 is now on the surface of the part 48 that is viewed and/or touched when the part 48 is installed in its desired location. Thus and in this embodiment, the part 48 comprises only substrate layer or panel 22 with a paint 96 applied to the show surface 92 in addition to the stitching 90, wherein the paint 96 may be applied before or after the stitching is applied and wherein this part 48 comprising only substrate layer or panel 22 may include or may exclude the molded faux seam 94.

In these embodiments or in any of the previous embodiments, the stitching 90 can be accomplished either manually or robotically, depending on part size and complexity.

Although, this embodiment may be applicable to interior surfaces of a vehicle, it can be used on any part on a vehicle that can be penetrated by the awl and could be sewn, including exterior components (e.g. composite parts). While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A method of applying stitching to an interior component, comprising only a single substrate layer, the method comprising:
   a) penetrating only the single substrate layer with an awl to form a piercing therethrough;
   b) retracting the awl from the single substrate layer;
   c) inserting a needle of a robotic sewing head through the piercing through the single substrate layer to grasp a thread positioned on a show surface of the single substrate layer;
   d) pulling the thread through the single substrate layer;
   e) looping the thread with a previous stitch passed through the single substrate layer;

f) advancing the robotic sewing head to another position with respect to the interior component, wherein a backside of the single substrate layer is free of obstructions; and g) repeating steps a-f until a predetermined amount of stitches are applied to the interior component.

2. A method of applying stitching to an interior component, comprising only a single substrate layer, the method comprising:

a) penetrating the substrate layer with an awl to form a piercing therethrough;

b) retracting the awl from the substrate layer;

c) inserting a needle of a robotic sewing head through the piercing through the substrate layer to grasp a thread positioned on a show surface of the substrate;

d) pulling the thread through the substrate layer;

e) looping the thread with a previous stitch passed through the substrate layer;

f) advancing the robotic sewing head to another position with respect to the interior component, wherein a backside of the substrate layer is free of obstructions; and g) repeating steps a-f until a predetermined amount of stitches are applied to the interior component, wherein the substrate layer is formed from plastic.

3. An interior component formed by the method of claim 2, wherein the interior component is an interior trim piece of a vehicle and wherein the substrate layer is configured to have graining on the show surface of the substrate layer.

4. The interior component of claim 3, wherein the interior trim piece is a portion of an instrument panel of the vehicle.

5. An interior component formed by the method of claim 1, wherein the interior component is an interior trim piece of a vehicle.

6. The interior component of claim 5, wherein the interior trim piece is a portion of an instrument panel of the vehicle.

7. The method as in claim 2, wherein the substrate layer is molded with a faux seam.

8. The interior component formed by the method of claim 1, wherein the backside of the substrate layer is free of obstructions along the entire stitch length.

9. The interior of claim 8, wherein the interior component is an interior trim piece of a vehicle.

10. The interior component of claim 9, wherein the interior trim piece is a portion of an instrument panel of the vehicle.

11. An interior component formed by the method of applying stitching to an interior component, comprising only a single substrate layer, the method comprising:

a) penetrating the substrate layer with an awl to form a piercing therethrough;

b) retracting the awl from the substrate layer;

c) inserting a needle of a robotic sewing head through the piercing through the substrate layer to grasp a thread positioned on a show surface of the substrate;

d) pulling the thread through the substrate layer;

e) looping the thread with a previous stitch passed through the substrate layer;

f) advancing the robotic sewing head to another position with respect to the interior component, wherein a backside of the substrate layer is free of obstructions; and g) repeating steps a-f until a predetermined amount of stitches are applied to the interior component, wherein the backside of the substrate layer is configured to have a separate component attached thereto, the separate component being free of any obstructions.

12. The interior component of claim 11, wherein the interior component is an interior trim piece of a vehicle.

13. The interior component of claim 12, wherein the interior trim piece is a portion of an instrument panel of the vehicle.

14. The interior component of claim 13, wherein the substrate layer is formed from plastic and a layer of soft touch paint is applied to the show surface of the interior component prior to sewing in order to provide softer show surface than that of the material of the substrate layer.

15. An interior component formed by the method of claim 2, wherein the interior component is an interior trim piece of a vehicle.

16. The interior component of claim 15, wherein the interior trim piece is a portion of an instrument panel of the vehicle.

17. The method as in claim 2, wherein a layer of soft touch paint is applied to the show surface of the interior component prior to sewing in order to provide softer show surface than that of the material of the substrate layer.

18. A method of applying stitching to an interior component, comprising only a single substrate layer, the method comprising:

a) penetrating the substrate layer with an awl to form a piercing therethrough;

b) retracting the awl from the substrate layer;

c) inserting a needle of a robotic sewing head through the piercing through the substrate layer to grasp a thread positioned on a show surface of the substrate;

d) pulling the thread through the substrate layer;

e) looping the thread with a previous stitch passed through the substrate layer;

f) advancing the robotic sewing head to another position with respect to the interior component, wherein a backside of the substrate layer is free of obstructions; and g) repeating steps a-f until a predetermined amount of stitches are applied to the interior component, wherein the substrate layer is configured to have graining on the show surface of the substrate layer.

* * * * *